United States Patent [19]
Rauterkus et al.

[11] 3,950,302
[45] Apr. 13, 1976

[54] DISPERSIBLE COPOLYMER POWDER

[75] Inventors: Karl Josef Rauterkus, Kelkheim, Taunus; Jan Blazek, Bad Soden, Taunus; Wolfgang Zimmermann, Frankfurt am Main, all of Germany

[73] Assignee: Hoechst Aktiengesellschaft, Frankfurt am Main, Germany

[22] Filed: May 2, 1973

[21] Appl. No.: 356,405

[30] Foreign Application Priority Data

May 5, 1972    Germany.......................... 2222033

[52] U.S. Cl.... 260/42.52; 260/29.6 TA; 260/80.73; 260/85.7; 260/96 R
[51] Int. Cl.² C08F 6/10; C08F 218/04; C08F 218/08; C08F 218/10
[58] Field of Search ....... 260/80.73, 85.7, 96, 42.52

[56] References Cited
UNITED STATES PATENTS

| | | | |
|---|---|---|---|
| 3,104,234 | 9/1963 | Bray | 260/41 |
| 3,365,409 | 1/1968 | Lanthier | 260/29.6 |
| 3,380,851 | 4/1968 | Lindemann et al. | 117/140 |
| 3,463,751 | 8/1969 | Hasegawa et al. | 260/23 |
| 3,577,376 | 5/1971 | Lanthier et al. | 260/29.6 |
| 3,714,099 | 1/1973 | Biale | 260/29.6 TA |
| 3,725,124 | 4/1973 | Gorton | 117/138.8 UA |
| 3,753,958 | 8/1973 | Wingler et al. | 260/78.5 R |
| 3,828,012 | 8/1964 | Arndt et al. | 260/80.73 |

Primary Examiner—Stanford M. Levin
Attorney, Agent, or Firm—Curtis, Morris & Safford

[57]    ABSTRACT

A dispersible copolymer powder comprising vinyl ester, an acrylamide and optionally ethylene units is obtained by carying out the copolymerization reaction in an emulsifier-free aqueous medium and drying the emulsifier free aqueous dispersion of the copolymer in the absence of anti-caking agents. The copolymer powder has a very good storage stability and can be easily redispersed in water to give a dispersion having a high binder content.

9 Claims, No Drawings

DISPERSIBLE COPOLYMER POWDER

The present invention relates to a dispersible copolymer powder on the basis of at least one vinyl ester, optionally ethylene and at least one acrylamide component, and a process for the preparation thereof.

Dispersible copolymer powders containing vinyl ester and ethylene units incorporated by polymerization are known. They are manufactured from the corresponding aqueous dispersions by a drying process, for example vacuum freeze or spray drying, and they are applied in paints, coatings or adhesives, or in the building field for mortars and surfacers, or as additive for inorganic binders. However, in the spray drying of aqueous plastics dispersions having a low minimum film-forming temperature, for example vinyl acetate-/ethylene dispersions, generally a heavy undesired deposit on the walls of the dryer is formed after a short time. This layer formation may be suppressed by addition of inorganic fillers, so-called anti-caking agents, during the drying process. An aqueous plastics dispersion having a minimum film-forming temperature of below about 12°C practically cannot be spray dried without adding such a filler. Dispersible copolymer powders, therefore, often contain up to 40 weight % of fillers, relative to the total mixture. The anti-caking agents improve the storage stability of the powder by avoiding caking and clogging as far as possible; on the other hand, they decrease the content of active binder substance necessary for the final application of the product. Moreover, the anti-caking agents may deteriorate the redispersibility of the powder in water and the transparence of the polymer films prepared from this dispersion. Furthermore, the chemical properties of such fillers may restrict the application of the powder in certain fields.

In has now been found that emulsifier-free, dispersible copolymers on the basis of at least one vinyl ester, optionally ethylene and at least one acrylamide component of the formula (I)

$$CH_2=CX-CO-NHY \qquad (I)$$

where
X is hydrogen or methyl,
Y is hydrogen or $-CH_2-O-Z$, and
Z is hydrogen or alkyl or acyl having from 1 to 4 carbon atoms,
can be dried in an advantageous manner, thus obtaining surprisingly a dispersible copolymer powder which does not require anti-caking agents though having an excellent storage stability at a minimum film forming temperature of below 12°C. The copolymers are obtained by carrying out the polymerization reaction in an emulsifier free aqueous dispersion. The dispersible powder of the invention is composed of from about 50 to 92 weight %, preferably from 65 to 85 weight %, or vinyl ester units, from about 0 to 45 weight %, preferably from 5 to 20 weight %, of ethylene units, and from about 2 to 20 weight %, preferably from 3 to 15 weight %, of units of acrylamide, methacrylamide or the derivatives thereof according to the above formula I. As vinyl esters, there may be used for example vinyl laurate, vinyl stearate, vinyl butyrate, preferably vinyl acetate or vinyl propionate. Suitable acrylamide derivatives are, besides (meth)acrylamide, for example N-methylol-(meth)-acrylamide or (meth)acrylamide-N-methylol-methyl ether.

The drying of the aqueous dispersion may be carried out according to known processes of spray, drum, vacuum freeze drying or fluidized bed spray granulation. Spray drying, however, is preferred. In this process, the dispersion is forwarded to a two-component spray nozzle by means of a pump, for example an eccentric screw pump, and sprayed in a drying tower. As drying gas, there may be used air as well as nitrogen, the temperature of which may be of from 90° to 110°C at the entrance of the tower, in the cyclone of about 60°C.

During the drying process, no deposit of importance occurs on the walls, so that an addition of anti-caking agents despite the low minimum film-forming temperature of about 0°C is not necessary. On the other hand, it is also possible to blend the dispersible powder of the invention with fillers for extension or cost reducing purposes. The filler may be added before, during or after the drying process.

The dispersible powder of the invention has a very good storage stability: even after a 24 hour storage at 50°C and a pressure of 0.5 kg/cm², it remains pulverulent, while other dispersible powders, despite a content of anti-caking agents, become heavily clogged under these conditions.

When the powder of the invention is redispersed in water, for example in a 1 : 1 ratio, a stable dispersion which does not precipitate is obtained within a short time. Because of the absence of inorganic fillers, this dispersion has a high binder content which is advantageous for the final application.

A polymer film obtained from this dispersion has the same minimum film-forming temperature of about 0°C as the starting dispersion, and it is clear and tough. The film has a very good adhesion on different substrates, such as wood, glass or paper. It can be easily reemulsified with water, so that the dispersible powders of the invention are very well suited for the preparation of rewettable adhesive coatings. They may also be used for wall paper paste compositions or for the coating of wall paper backs, furthermore serve as binder in emulsion paints or plastics containing mortars, as well as be employed for textile finishing.

The following Example illustrates the invention.

EXAMPLE:

A. Preparation of the starting dispersion

A 30 l polymerization pressure autoclave provided with a heating and a cooling jacket, an anchor agitator and three feed pumps for liquids is carefully evacuated and alternatively flushed with nitrogen. Subsequently, a mixture of 4000 g of water, 600 g of vinyl acetate and 10 g of t-butylhydroperoxide is introduced. With agitation this starting batch is heated to 50°C. At this temperature, an ethylene pressure of 30 atmospheres is established, and subsequently, the following three solutions are introduced simultaneously by means of pumps:

a. a solution of 30 g of t-butylhydroperoxide in 7160 g of vinyl acetate,
b. a solution of 600 g of acrylamide in 1400 g of water, and
c. a solution of 40 g of sodium pyrophosphate and 40 g of sodium disulfite in 2000 g of water.

The solutions (a) and (b) are added within 4 hours, solution (c) within 4 hours and 10 minutes. The ethylene pressure and the temperature are maintained constant during the reaction.

After addition of solution (c), the batch is maintained at reaction temperature for a further hour. Subsequently, the dispersion in the vessel is slowly cooled to room temperature, and then discharged via the bottom valve.

| Properties of the dispersion: | |
|---|---|
| Polymer content | 54.1 % |
| Viscosity | 1.95 poise |
| pH | 5.8 |
| Minimum film-forming temperature | 0°C |

B. Preparation of the dispersible copolymer powder

The starting dispersion obtained in the Example under (A) is diluted with deionized water until a polymer content of 40 weight % is attained. Subsequently, it is dried concurrently with the drying gas in a spray tower, the cyclindrical part of which has a length of 4 m and a diameter of 1.6 m, and the conical part of which has a length of 2 m. The dispersion is fed in by an eccentric screw pump and sprayed through a two-component spray nozzle having holes of 2 mm each.

| Drying gas | air |
|---|---|
| Throughput | 700 Nm³/h (N = at 20°C and 760 mm Hg) |
| Feed temperature | 90°C |
| Spray gas | air |
| Pressure in front of nozzle | 5 atm |
| Throughput | 70 kg/h |
| Feed temperature | 20°C |

The dispersion can be sprayed without difficulty. Only an insignificant deposit of dry powder blown onto the wall occurs, which layer is loose and can be easily blown off again. Caking or clogging of this layer does not occur under the indicated drying conditions.

The dispersible copolymer powder so obtained has a very good storage stability and may be easily mixed with water to form a 50% dispersion the viscosity of which at 20°C is 1.17 poise. A thin layer of this dispersion dries to form a clear, transparent, tough and resistant polymer film.

What is claimed is:

1. A dry readily dispersible emulsifier free and anti-caking agent free copolymer powder, consisting essentially of 50 to 92 weight percent vinyl ester, 0 to 45 weight percent of ethylene and 2 to 20 weight percent acrylamide of the formula $CH_2=CX-CO-NHY$, wherein X is hydrogen or methyl, Y is hydrogen or $CH_2OZ$, and Z is hydrogen, alkyl of 1 to 4 carbon atoms or acyl of 1 to 4 carbon atoms, obtained by emulsion copolymerizing, in an emulsifier-free aqueous medium, said vinyl ester; optionally ethylene; and said acrylamide and spray drying the resulting emulsifier free copolymerized product dispersion, in the absence of an anti-caking agent, to yield a free flowing dry copolymer powder.

2. The readily dispersible copolymer powder of claim 1 wherein the vinyl ester is a member selected from the group consisting of vinyl acetate, vinyl proprionate, vinyl butyrate, vinyl laurate and vinyl stearate and the acrylamide is a member selected from the group consisting of acrylamide, methacrylamide, N-methylolmethacrylamide and methacrylamide-N-methylolmethyl ether.

3. The dry readily dispersible copolymer powder of claim 1 wherein the copolymer is composed of from 50 to 92 weight percent of vinyl ester of the formula

from 0 to 45 weight percent of ethylene, and from 2 to 20 weight percent of acrylamide of the formula

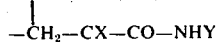

where R is a straight-chained or branched alkyl of 1 to 18 carbon atoms, X is hydrogen or methyl, Y is hydrogen or $CH_2OZ$, and Z is hydrogen, alkyl of 1 to 4 carbon atoms or acyl of 1 to 4 carbon atoms.

4. The readily dispersible copolymer powder of claim 1 which contains from 0 to 40 weight percent of inorganic fillers.

5. The process for the preparation of a readily dispersible emulsifier-free and anti-caking agent free copolymer powder which comprises copolymerizing in an emulsifier-free aqueous medium at least one vinyl ester; optionally ethylene; and at least one acrylamide of the formula $CH_2=CX-CO-NHY$, wherein X is hydrogen or methyl, Y is hydrogen or $CH_2OZ$, and Z is hydrogen, alkyl of 1 to 4 carbon atoms or acyl of 1 to 4 carbon atoms, and spray drying the resulting emulsifier free copolymerized product dispersion, in the absence of an anti-caking agent, to yield a free flowing powder of the copolymer.

6. The process of claim 5 wherein the copolymer comprises 50 to 92 weight percent vinyl ester of the formula

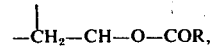

wherein R is straight-chain or branched alkyl of 1 to 18 carbon atoms, from 0 to 45 weight percent of ethylene, and from 2 to 20 weight percent of said acrylamide.

7. The process of claim 6 wherein the copolymerizing is carried out by emulsion polymerization.

8. The process for preparing the copolymer powder of claim 5 wherein the vinyl ester is a member selected from the group consisting of vinyl acetate, vinyl proprionate, vinyl butyrate, vinyl laurate and vinyl stearate and the acrylamide is a member selected from the group consisting of acrylamide, methacrylamide, N-methylol-methacrylamide and methacrylamide-N-methylol-methyl ether.

9. The process for the preparation of the readily dispersible copolymer powder of claim 5 which comprises spraying an aqueous, emulsifier-free dispersion of a copolymerization product of at least one of said vinyl esters; optionally ethylene; and at least one of said acrylamides in a drying tower using air or nitrogen as a drying gas.

* * * * *